(12) United States Patent
Li et al.

(10) Patent No.: US 11,041,388 B2
(45) Date of Patent: Jun. 22, 2021

(54) BLADE CUTBACK DISTRIBUTION IN ROTOR FOR NOISE REDUCTION

(71) Applicant: PRATT & WHITNEY CANADA CORP., Longueuil (CA)

(72) Inventors: Yau-Wai Li, Mississauga (CA); Peter Townsend, Mississauga (CA); Vijay Kandasamy, Tamil Nadu (IN)

(73) Assignee: Pratt & Whitney Canada Corp., Longueuil (CA)

( * ) Notice: Subject to any disclaimer, the term of this patent is extended or adjusted under 35 U.S.C. 154(b) by 625 days.

(21) Appl. No.: 14/673,101

(22) Filed: Mar. 30, 2015

(65) Prior Publication Data
US 2016/0290137 A1 Oct. 6, 2016

(51) Int. Cl.
| | | |
|---|---|---|
| *F01D 25/04* | (2006.01) | |
| *F01D 5/14* | (2006.01) | |
| *F04D 29/66* | (2006.01) | |
| *F04D 29/32* | (2006.01) | |

(52) U.S. Cl.
CPC ............ *F01D 5/141* (2013.01); *F04D 29/324* (2013.01); *F04D 29/666* (2013.01); *F05D 2220/36* (2013.01); *F05D 2240/303* (2013.01); *F05D 2240/304* (2013.01); *F05D 2240/307* (2013.01); *F05D 2260/961* (2013.01); *Y02T 50/60* (2013.01)

(58) Field of Classification Search
CPC ..... F04D 29/666; F04D 29/327; F04D 29/328
USPC ........................................................ 416/228
See application file for complete search history.

(56) References Cited

U.S. PATENT DOCUMENTS

| | | | |
|---|---|---|---|
| 3,403,893 A * | 10/1968 | Stoffer | F01D 5/141 416/228 |
| 4,089,618 A | 5/1978 | Patel | |
| 4,097,192 A * | 6/1978 | Kulina | F01D 5/14 416/175 |
| 4,514,143 A | 4/1985 | Campbell | |
| 4,878,810 A * | 11/1989 | Evans | F01D 5/16 416/175 |
| 4,961,686 A * | 10/1990 | Blair | B23P 6/002 415/181 |
| 5,074,376 A | 12/1991 | Powell | |
| 5,603,607 A | 2/1997 | Kondo et al. | |
| 6,428,278 B1 * | 8/2002 | Montgomery | F01D 5/10 416/203 |
| 6,648,602 B2 * | 11/2003 | Horng | F04D 29/327 416/203 |
| 6,733,240 B2 | 5/2004 | Gliebe | |

(Continued)

FOREIGN PATENT DOCUMENTS

| | | |
|---|---|---|
| EP | 1211383 A2 | 6/2002 |
| WO | 2008097287 A2 | 8/2008 |

*Primary Examiner* — Ninh H. Nguyen
*Assistant Examiner* — Jason Fountain
(74) *Attorney, Agent, or Firm* — Getz Balich LLC (57) ABSTRACT

A gas turbine engine includes rotor having a hub, and a plurality of blades extending generally radially from the hub. Each of the blades has an airfoil portion. The airfoil portion has a leading edge and a trailing edge defining a chordwise direction, and a root and a tip defining a spanwise direction. Only a sub-set of the blades has a cutback at at least one of the trailing edge and the leading edge. A method of designing and a method of assembling a rotor having noise reduction properties in a gas turbine engine is also presented.

11 Claims, 8 Drawing Sheets

(56) References Cited

U.S. PATENT DOCUMENTS

| | | | |
|---|---|---|---|
| 6,779,978 B2 | 8/2004 | Camargo Do Amarante | |
| 7,351,039 B2* | 4/2008 | Bachofner | F01D 5/141 |
| | | | 416/223 A |
| 7,500,299 B2* | 3/2009 | Dupeux | F01D 5/10 |
| | | | 29/407.07 |
| 8,043,063 B2* | 10/2011 | Kelly | F01D 5/10 |
| | | | 415/119 |
| 8,973,374 B2* | 3/2015 | Sharma | F01D 5/142 |
| | | | 415/199.5 |
| 9,835,166 B2* | 12/2017 | Schoenenborn | F04D 29/185 |
| 2003/0123975 A1* | 7/2003 | Horng | F04D 29/327 |
| | | | 415/119 |
| 2007/0269316 A1* | 11/2007 | Williams | B23P 6/002 |
| | | | 416/223 R |
| 2014/0050590 A1 | 2/2014 | Ghorbani Zarimahalleh et al. | |
| 2014/0301860 A1 | 10/2014 | Ramm et al. | |
| 2015/0139789 A1* | 5/2015 | Schoenenborn | F04D 29/185 |
| | | | 415/208.1 |

* cited by examiner

FIG. 9

BLADE CUTBACK DISTRIBUTION IN ROTOR FOR NOISE REDUCTION

TECHNICAL FIELD

The application relates generally to gas turbine engines and, more particularly, to rotors of gas turbine engines.

BACKGROUND

Current fan noise control methods may be expensive and complex to design. These methods may include, for example, forward swept blade design, operating the engine at high bypass ratio, geared turbofan, scarfed inlet, trailing edge blowing or using a variable nozzle. Acoustic treatments for the fan and bypass stator vanes may also be used to reduce the noise. Changing the fan running line by using a variable nozzle may increase engine complexity, cost and weight. Other active methods that could be used to control noise, such as trailing edge blowing, involve drilling holes inside the fan blade for blowing flow.

SUMMARY

In one aspect, there is provided a gas turbine engine comprising: a rotor including: a hub; and a plurality of blades extending generally radially from the hub, each of the blades having an airfoil portion, the airfoil portion having a leading edge and a trailing edge defining a chordwise direction, and a root and a tip defining a spanwise direction, only a sub-set of the blades having a cutback at at least one of the trailing edge and the leading edge.

In another aspect, there is provided a method of assembling a rotor of a gas turbine engine, the method comprising: obtaining a pattern of disposition of blades about a hub, the pattern of disposition having at least a first and a second set of blades having shapes different from one another and positions relative to one another based on predetermined zones of asymmetrical shockwave distribution of the flow around the rotor, such that, when in operation, a flow around the rotor has a substantially symmetrical shockwave distribution; obtaining a first set of blades including at least one blade having a first shape as determined by the pattern; obtaining a second set of blades including at least one blade having a second shape different from the first shape as determined by the pattern; and assembling the first and second sets of blades onto the hub to replicate the pattern of disposition.

In a further aspect, a method of assembling a rotor of a gas turbine engine, the method comprising: obtaining a pattern of disposition of blades about a hub, the pattern of disposition having at least a first and a second set of blades having shapes different from one another such that, when in operation, a flow around the rotor has a substantially symmetrical shockwave distribution; obtaining a first set of blades including at least one blade having a first shape as determined by the pattern; obtaining a second set of blades including at least one blade having a second shape different from the first shape and designed based on predetermined zones of asymmetrical shockwave distribution of the flow around the rotor; and assembling the first and second sets of blades onto the hub to replicate the pattern of disposition.

DESCRIPTION OF THE DRAWINGS

Reference is now made to the accompanying figures in which.

DETAILED DESCRIPTION

Figure 1:
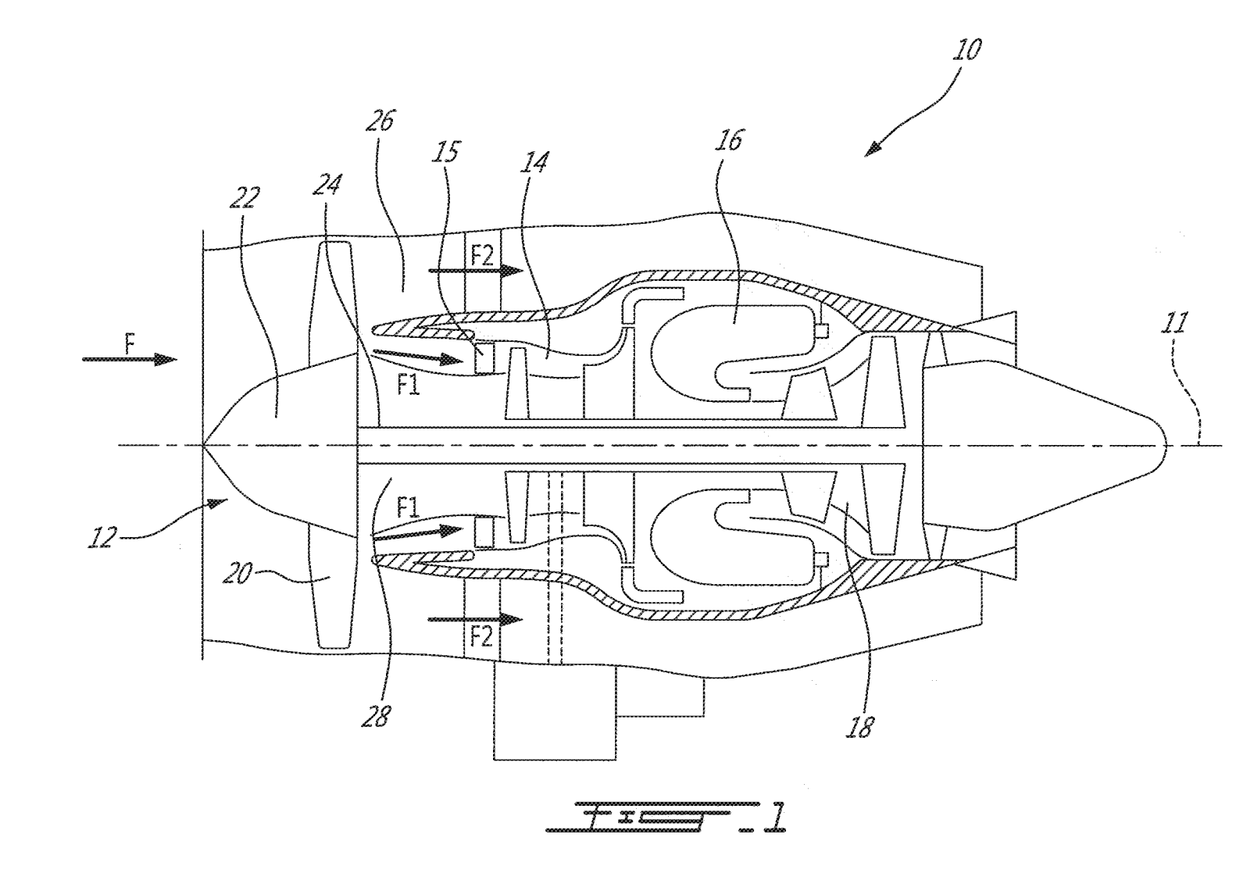
FIG. 1 is a schematic cross-sectional view of a gas turbine engine.

FIG. 1 illustrates a turbofan type gas turbine engine 10 of a type preferably provided for use in subsonic flight, generally comprising in serial flow communication a fan 12 through which ambient air is propelled, a compressor section 14 for pressurizing the air, a bypass stator 15, a combustor 16 in which the compressed air is mixed with fuel and ignited for generating an annular stream of hot combustion gases, and a turbine section 18 for extracting energy from the combustion gases.

The fan 12 includes a plurality of blades 20 extending radially from a hub 22. The fan 12 is made of a number X of blades that is in one embodiment nineteen. The fan 12 could have various numbers of blades 20. It could have an even or odd number of blades 20. The hub 22 is connected to the turbine section 18 by a shaft 24, which transmit power generated by the turbine section 18 to the fan 12 for rotating it. A flow of air F passing through the rotating fan 12 is separated downstream of the fan 12 into a core flow F1 flowing into a core section 28 of the gas turbine engine 10, and a bypass flow F2 flowing through a bypass section 26 of the gas turbine engine 10. The core section 28 includes the compressor section 14, combustor 16 and turbine section 18. The core flow F1 powers the fan 12 and provides propulsion thrust. The bypass flow F2 flows annularly around the core flow F1, and provides additional propulsion thrust.

Figure 2:
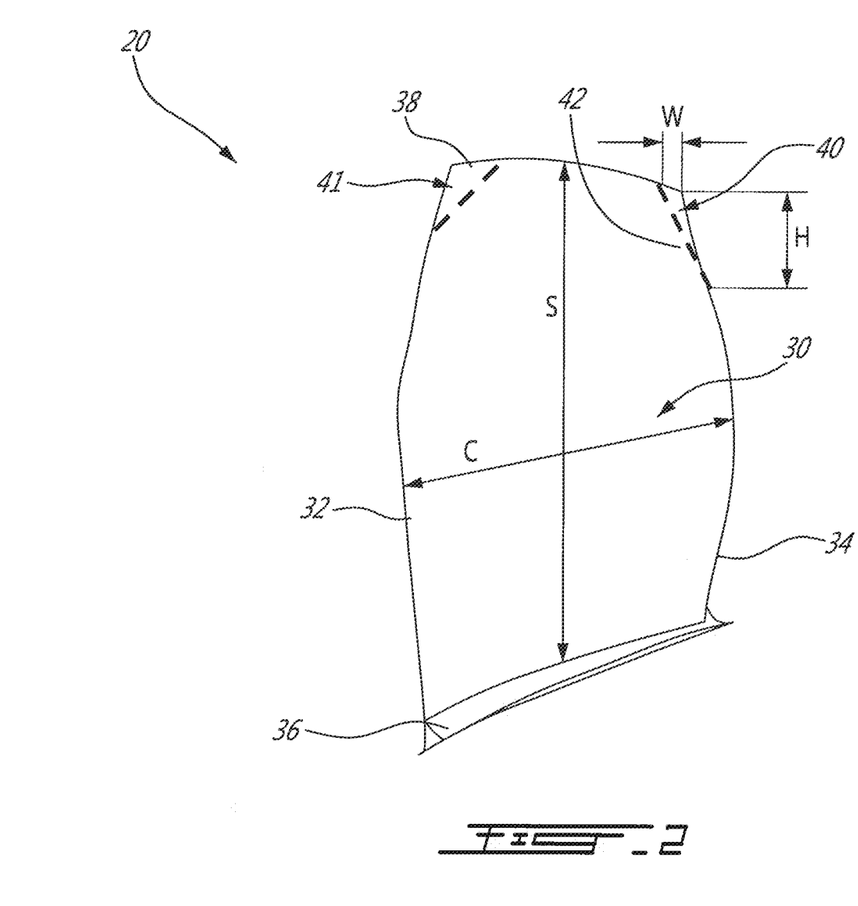
FIG. 2 is a schematic front view of a blade for the fan of the gas turbine engine of FIG. 1.

Turning to FIG. 2, each of the blades 20 of the fan 12 includes an airfoil portion 30 having a leading edge 32 and a trailing edge 34, defining a chord C direction of the blade 20. The airfoil portion 30 includes a root 36 disposed proximate to the hub 22 and a tip 38, defining a span S direction of the blade 20. The blades 20 have identical shapes to one another except for a discrete number of them (a sub-set comprised between 1 and X−1, where X is a total number of blades) which have a cutback 40. In one embodiment, the cutback 40 is a complete cut through the airfoil portion 30 at the trailing edge 34. An example of trailing edge cutback 40 is shown by dotted line 42. In one embodiment, the cutback is a cutback 41 at the leading edge 32 (shown in dotted lines). In one embodiment, the sub-set of blades includes both a cutback at the leading edge 32 and a cutback at the trailing edge 34. The blades 20 will be described herein in reference with the trailing edge cutback 40. It is however contemplated that a similar description could be applied to blades having a leading edge cutback and blades having both a leading edge cutback and a trailing edge cutback.

The cutbacks 40 may not be cut back in the blades 20, but the blades 20 may instead be formed with the cutbacks 40. One or more blades 20 would have the cutback 40, as long as not all of them have the cutback 40. In one embodiment, the blades 20 of the fan 12 besides the cutback 40, in at least one but not all of the blades 20, are otherwise identical.

By introducing the cutback 40 in only a sub-set of the blades 20, that is in only some (at least one) but not all of the blades 20, the bow waves upstream of the fan blades are evened out, therefore, a reduction of the noise generated by the fan 12 may be accomplished. Also, when the air F flows through the fan 12, it creates fan wakes in the bypass flow F2 downstream of the fan 12. The interaction between the fan wakes and the downstream bypass stators 15 is a source of fan noise. The strength of the fan wakes may be influenced by the strength of the shock in the fan passage. The cutbacks 40 at the trailing edges 34 on a few fan blades 20 may alter the shockwave pattern (or distribution) in the blade passages and perturb the exit flow pattern from the fan 20. This perturbation may create more symmetry in the shockwave pattern and in turn reduce the noise level created by the fan 12.

Figure 3A:
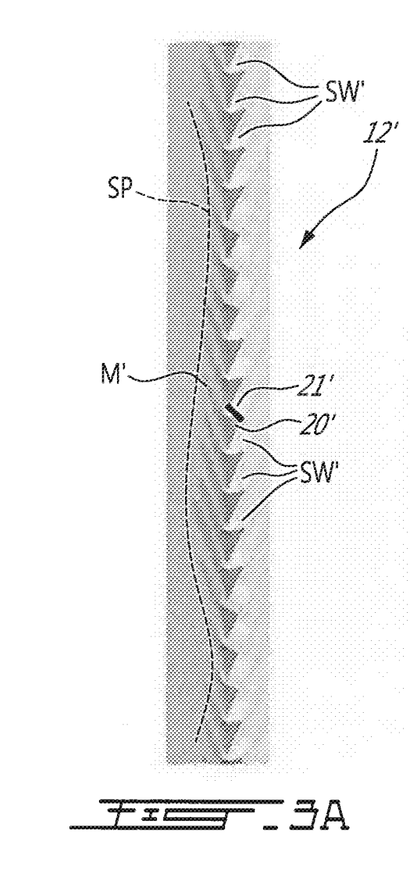
FIG. 3A schematically illustrates the Mach flow contours around the fan at 90 percent span of each blade for a baseline fan with all identical blades (the fan being shown unwrapped, i.e. the blades being shown in-line as opposed to along a circle)
Figure 4A:
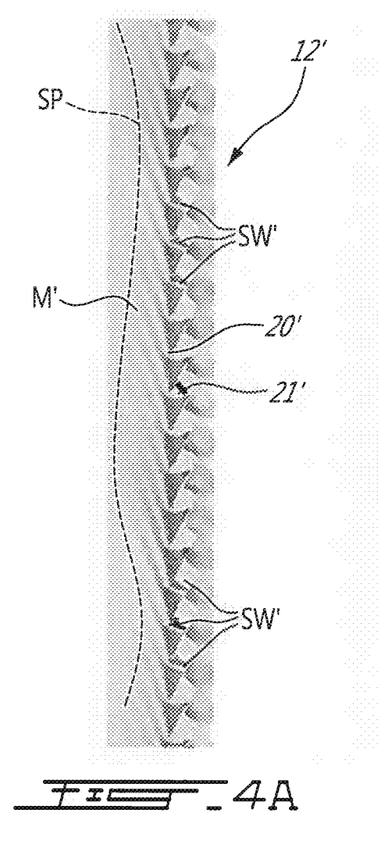
FIG. 4A schematically illustrates the static pressure flow contours around the fan at 90 percent span of each blade for a baseline fan with all identical blades (the fan being shown unwrapped)

When studying the flow and pressure field around the fan 12, it is traditionally understood that the flow field is periodic and that the flow of the whole fan 12 can be deduced from the flow around only one of the blades. The flow around the blade can then be reproduced around each blade since the blades have usually the same shape and size throughout the fan. Calculations of the flow around a complete fan having a plurality of identical blades has revealed that the flow field and pressure field is not identical for each blade. Referring to FIGS. 3A and 4A, the flow field (3A) and pressure field (4A) of a baseline fan 12' (i.e. fan having a plurality of identical blades 20') is being shown according to one non-limiting example. The strength of bow waves M' upstream of the blades 20' varies from one blade 20' to another. The strength of the bow waves M' is not only not identical but adopts varying distribution profiles, such as a sine pattern (shown by dotted line SP). The presence of downstream shockwaves SW' is also noted in some (in this example 6) but not all throats 21', showing the non-identical flow downstream wake from around each blade 20' of the baseline fan 12'. The throat 21' may be defined as the minimum passage distance between two adjacent blades, usually from the leading edge of one blade to the suction surface of the adjacent blade.

Figure 3B:
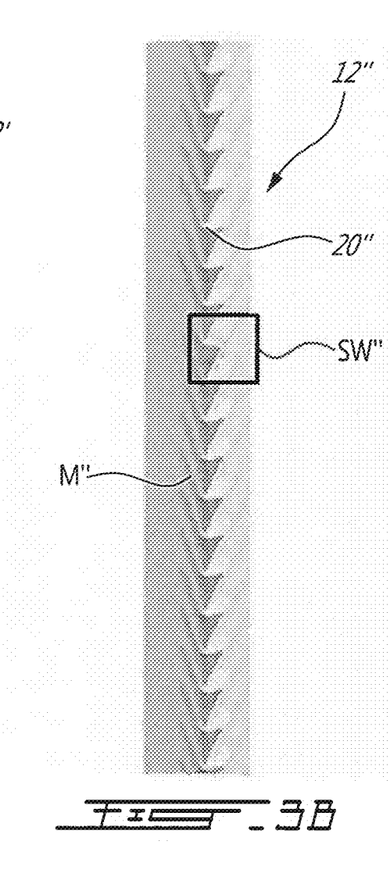
FIG. 3B schematically illustrates the Mach flow contours around the fan at 90 percent span of each blade for a fan having a single blade with a cutback according to one embodiment (the fan being shown unwrapped)
Figure 4B:
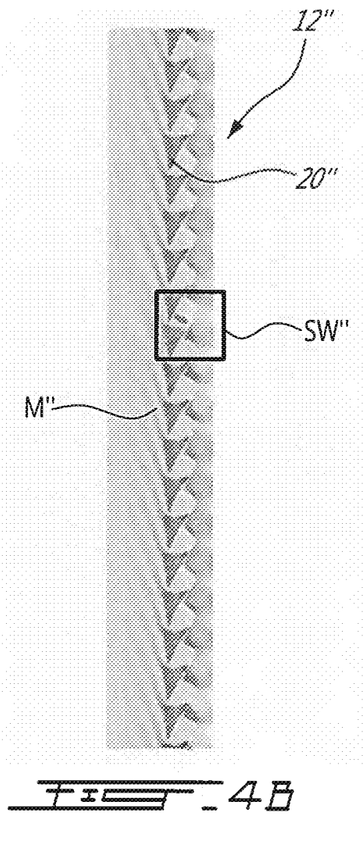
FIG. 4B schematically illustrates the static pressure flow contours around the fan at 90 percent span of each blade for a fan having one blade only with a cutback according to one embodiment (the fan being shown unwrapped)

Now looking at FIGS. 3B and 4B, the flow field (3B) and pressure field (4B) of a fan 12'' having only one of its blades 20'' with a cutback such as the cutback 40 are shown according to one non-limiting example. In this example, the cutback has improved symmetry of the flow. The strength of bow waves M'' is more uniform around the fan 12'' than in FIG. 3A, and the number of passages with strong, or swallowed shockwaves SW'' downstream of the throat is decreased (in this example only one shockwave SW'') compared to the baseline fan 12' of FIG. 3A.

Figure 3C:
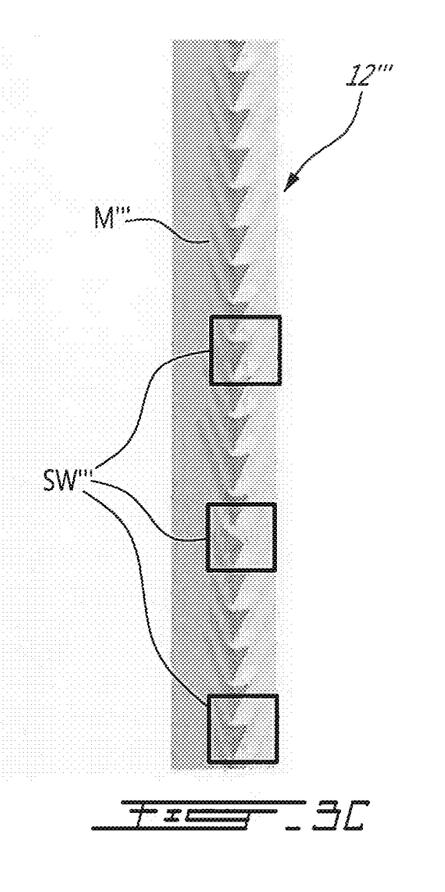
FIG. 3C schematically illustrates the Mach flow contours around the fan at 90 percent span of each blade for a fan having three blades with a cutback according to one embodiment (the fan being shown unwrapped)
Figure 4C:
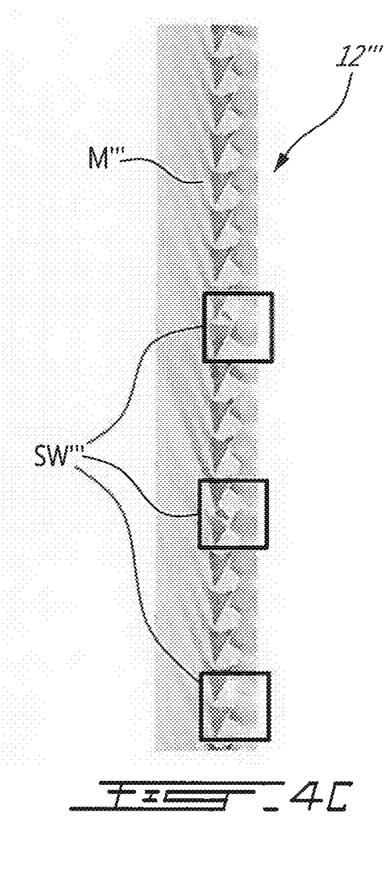
FIG. 4C schematically illustrates the static pressure flow contours around the fan at 90 percent span of each blade for a fan having three blades only with a cutback according to one embodiment (the fan being shown unwrapped)

In another example, now looking at FIGS. 3C and 4C, the flow field (3C) and pressure field (4C) of a fan 12''' having only three blades with cutback such as the cutback 40 is shown in a non-limiting example. In this example, the cutbacks have also improved symmetry of the flow. The strength of bow waves M''' is more uniform around the fan 12''' than in FIG. 3A, and the number of swallowed shockwaves SW''' downstream of the throat is decreased (in this example three shockwaves SW''') compared to the baseline fan 12' of FIG. 3A.

Figure 5A:
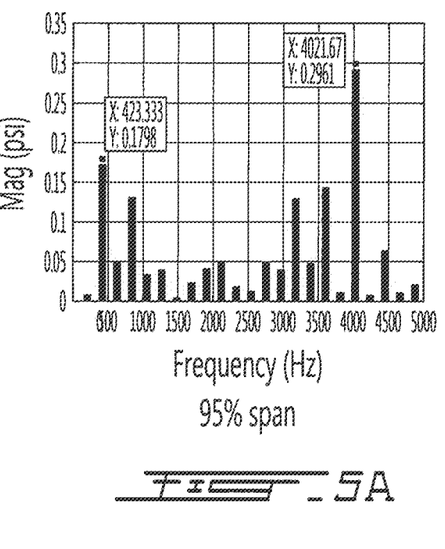
FIGS. 5A to 5C show the Fast Fourier Transform of the leading edge static pressure to a stationery observer, by the blades of the baseline fan at 95% span (FIG. 5A), 80% span (FIG. 5B), 70% span (FIG. 5C)
Figure 5B:
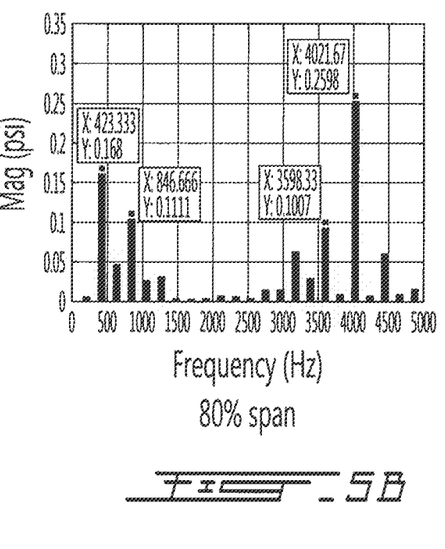
Figure 5C:
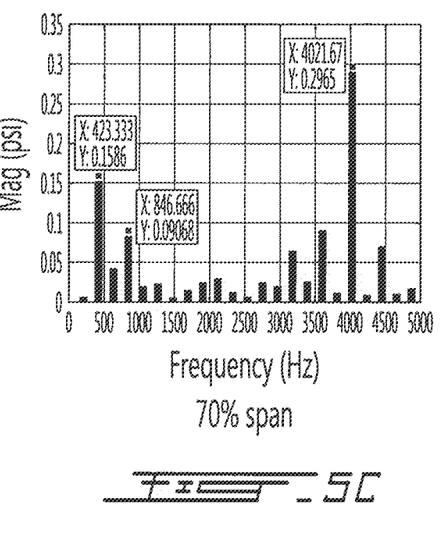
Figure 6A:
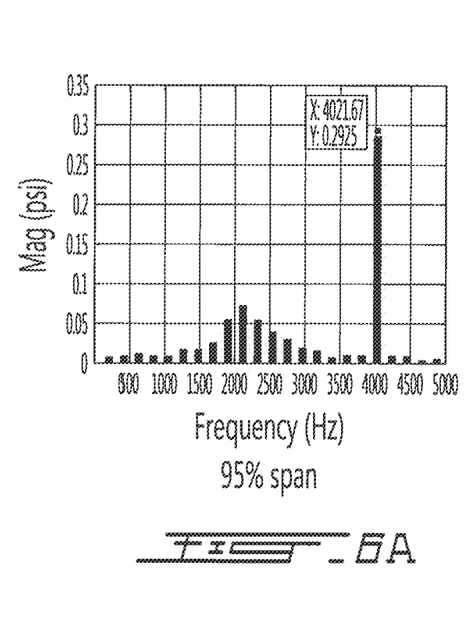
FIGS. 6A to 6C show the Fast Fourier Transform of the leading edge static pressure to a stationery observer, by the blades of a fan having one blade only with a cutback according to one embodiment at 95% span (FIG. 6A), 80% span (FIG. 6B), 70% span (FIG. 6C)
Figure 6B:
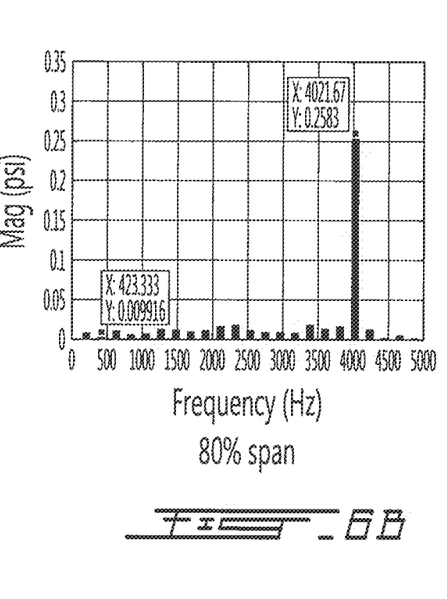
Figure 6C:
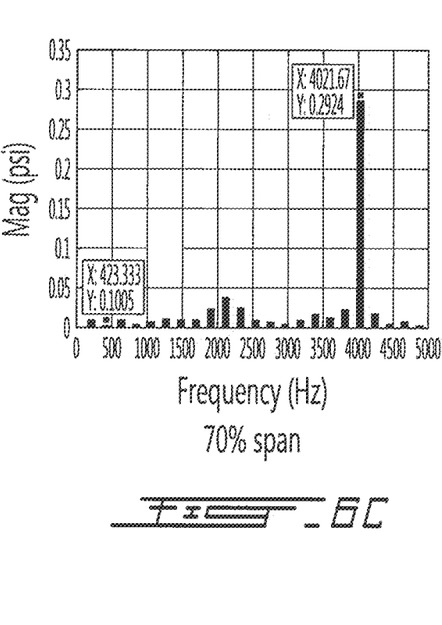

Referring now to FIGS. 5A to 6C, Fast Fourier Transform (FFT) is used to determine the effect of the cutbacks 40 on the noise level. The Fast Fourier Transform of the leading edge static pressure of the blades of the baseline fan 12' (FIGS. 5A to 5C) is compared to the Fast Fourier Transform of the leading edge static pressure of the blades of the fan 12'' having one cutback (FIGS. 6A to 6C). At 95% span, 80% span and 70% span, in one embodiment, a reduction in all noise frequencies besides the BPF (at 4,000 Hz) is observed. At 95% span the reduction is of at least 60%, at 80% span the reduction is of at least 94%, at 70% span the reduction is of at least 93%. In another embodiment only selected frequencies are reduced.

One reduction of interest observed in the embodiment shown in FIGS. 5A to 5C is the frequency at 423 Hz which has been observed as an undesirable noise measurements at certain engine speeds in customer aircraft flight. The noises at these particular frequencies, such as the one at 423 Hz, result from circumferential variation in the strength of the shockwave from one blade passage to other blade passage which creates both a pressure fluctuation upstream and a variation in the downstream fan wakes. The unsteady wakes which interact with the stator vanes 15 may produce further undesirable tones. The trailing edge cutback on one or several (but not all) fan blades may smooth out the spinning pattern of the flow field in both upstream of and downstream of the fan, and may in turn reduce noise.

Figure 7:
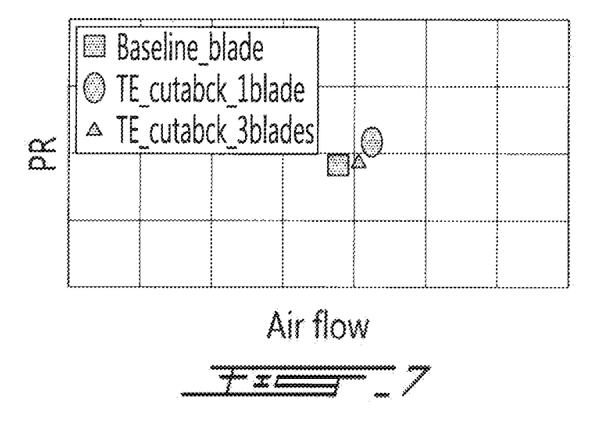
FIG. 7 shows the pressure ratio of a baseline fan, a fan with only one blade having cutback according to one embodiment, and a fan with three blades having a cutback according to one embodiment at the fan—flow F—.
Figure 8:
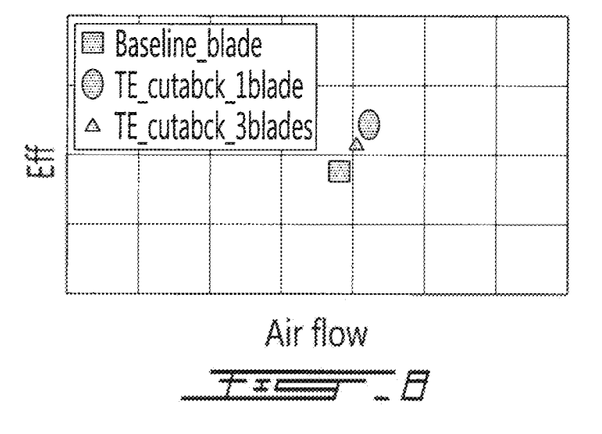
FIG. 8 shows the efficiency of a baseline fan, a fan with only one blade having cutback according to one embodiment, and a fan with three blades having a cutback according to one embodiment at the fan—flow F—.

Referring to FIGS. 7 and 8, the non-uniform or heterogonous (i.e. only some but not all the blades 20 have the cutbacks 40) distribution of the cutbacks 40 on the blades 20 of the fan 12 may not only reduce the sound pressure level but also improve the fan performance and overall bypass efficiency.

FIG. 7 shows the pressure ratio of the baseline fan 12', the fan 12'' with only one blade having the cutback and the fan 12''' with three blades having the cutback, all shown versus mass flow. The pressure ratio of the fans 12'', 12''' with cutbacks is equivalent to that of the baseline fan 12'. Flow for the fans with cutbacks were all improved.

Regarding the efficiency of the fan, FIG. 8 shows the efficiency of the baseline fan 12', of the fan 12" with only one blade having cutback and of the fan 12''' with three blades having the cutback, all shown versus mass flow. The efficiencies of the fans 12", 12''' with cutbacks may be over that the baseline fan 12'.

The number of blades 20 having cutbacks, such as the cutback 40, and their location within the distribution of the blades in the fan may be done in accordance with the desired reduction of one or more targeted frequencies. For certain frequencies, only one blade with a cutback may be desired, while for other frequencies, two or three blades with a cutback may be desired. The number of blades having the cutbacks 40 may be dependent on the mode shape of the unwanted frequency(ies). If more than one blade has the cutback, these blades could be adjacent to each other or separated by blades not having the cutback. In one embodiment, less than half of the blades 20 have the cutback 40. In one embodiment, only one blade 20 has the cutback 40. In one embodiment, three blades 20 have the cutback 40.

The location of the cutback 40 may also be determined in function of the reduction of noise desired. The Mach number at the blades' tip 38 is typically higher than at other locations of the blade 20, and a trailing edge cutback located at the tip 38 may be appropriate in certain cases than at any other regions of the blade 20. As a result, while the cutback 40 is shown in the figures to extend from the tip 38 of the blade 20, the cutback 40 could in certain cases be disposed away from the tip 38, yet still at the trailing edge 32. A size of the cutback 40 may be chosen in function of a particular disturbing frequency strength to reduce and hence as a function of a location of the shockwave. A width W of the cutback 40 may be between 10% and 30% of a maximum chord C of the blade 20, and a height H may be from 10% and 30% of a maximum span S of the blade 20. The cutbacks 40 could also not have all the same shape and size within the fan 12. The cutback 40 may have straight or curved sides (i.e. line 42) and/or edges. In the embodiment of the cutback 40 shown in FIG. 2, the cutback 40 is generally triangular. Other shapes are contemplated. For example the cutback could be a portion of a disc, or could have serrated edges. There could be more than one cutback on the blade having the cutback 40.

To manufacture a rotor, such as the fan 12, a model of the rotor is first generated. The model may be based on past or current designs of the rotor. Once the model of the rotor is generated, the flow around the rotor is modelled in an operating condition. The operating condition may be an altitude cruising condition. Based on the flow modeled, zones of asymmetrical presence of shockwaves in the modeled flow are determined. These zones are those identified above in FIGS. 3A and 4A. Once the zones of asymmetrical presence of shockwaves are identified, the modeled rotor is modified by modifying only a sub-set of the blades of the modeled rotor to have a cutback at a trailing edge, such as the cutback 40 described above, in order to obtain a substantially symmetrical shockwave pattern in the modeled flow. The size, shape of the cutback 40 as well as the number of blades of the sub-set and the position of the blades with the cutback relative to a rest of the blades of the rotor may be done based on the identified (or predetermined) zones of asymmetrical presence of shockwaves in the modeled flow. The modeled rotor may be modified until the modeled flow around the rotor presents a substantially symmetrical shockwave pattern such as the one shown in FIGS. 3C and 4C. Once the rotor providing a substantially symmetrical shockwave pattern is modeled, the rotor may be manufactured based thereon. A pattern of disposition or map may be generated to indicate the blades' shapes and disposition about the hub.

The heterogeneous cutback blades distribution could be applied to various engines, including turboprops and turbofans. It could also be applied to rotors other than the fan 12. For example it could be applied to compressor rotors. The heterogeneous cutback blades distribution may in one embodiment be applied in environment where the tip relative Mach number is greater than 1.4. The heterogeneous cutback blades distribution may be applied to any blade design, for example to leaned and/or swept blades.

Manufacturing a fan blade with a cutback may not add significantly to the manufacturing cost and difficulty. The fan or rotor having selected cutbacks may be integrally formed. In one embodiment, they may be integrally formed from a solid piece of titanium. Alternatively, the fan or rotor may be assembled after obtaining the set of blades with cutbacks and the set of blades without cutbacks.

The cutback may reduce the weight of the fan 12 without comprising its balance since the cutback 40 described above, is of relatively small size compared to the size of the blade 20.

Figure 9:
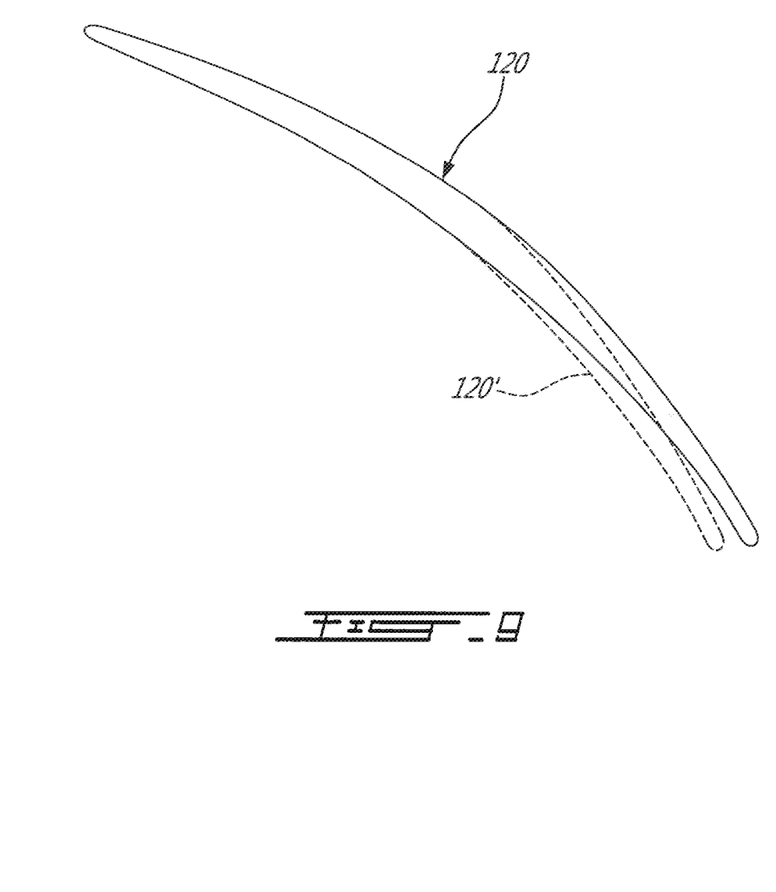
FIG. 9 is a schematic of cross-sectional view of a blade superimposed with the cross-sectional view of a similar blade but having a different camber.

While the fan 12 has been described herein to be designed and manufactured with a trailing edge cutback and/or a leading edge cutback, it is contemplated that the fan 12 could be designed with sub-set of blades having different shapes, some of which may not involve cutbacks, with the intent to provide a flow around the fan 12 with a substantially symmetrical presence of shockwaves so as to achieve noise reduction. For example, the fan 12 could have a sub-set of blades with a different leading edge or trailing edge profile than the rest of the blades. In another example, the fan 12 could have a sub-set of blades with a different cross-sectional profile than the rest of the blades. This could be achieved by having blades with different cambers. An example of such camber difference between blades of a same fan/rotor is shown in FIG. 9. FIG. 9 shows a sub-set of blades 120' (partially shown in phantom) has a more pronounced camber that a rest of the blades 120, in a rotor that would include the blades 120 and 120'. It is further contemplated that the sub-set of blades could have more than one noise reducing features. For example, the sub-set of blades could have a different camber and a cutback relative to the rest of the blades of that same fan/rotor.

While the fan 12 has been described with a single sub-set of blades having a cutback, it is contemplated that the fan 12 could have more than one, for example two, sub-sets of blades having different cutbacks.

The above description is meant to be exemplary only, and one skilled in the art will recognize that changes may be made to the embodiments described without departing from the scope of the invention disclosed. Although a bypass stator was described herein, the subset of blades having a cutback while the rest of the blades to other stators in similar when other similar noise sources are identified in the interaction between a rotor and a stator (e.g. the interaction between a compressor/core flow rotor with a compressor/core flow stator). Other modifications which fall within the scope of the present invention will be apparent to those skilled in the art, in light of a review of this disclosure, and such modifications are intended to fall within the appended claims.

The invention claimed is:

1. A gas turbine engine comprising:
   a rotor including:
      a hub; and
      a plurality of blades extending generally radially from the hub, each one of the blades having an airfoil portion, the airfoil portion having a leading edge and a trailing edge between a pressure surface and a suction surface, the leading edge and the trailing edge defining a chordwise direction, and a root and a tip defining a spanwise direction, only a sub-set of the plurality of blades, the sub-set of the plurality of blades having fewer blades than the plurality of blades, each blade within the sub-set of the plurality of blades having at least one cutback at the trailing edge from the suction surface to the pressure surface, the at least one cutback extending from the tip to the trailing edge of the respective blade.

2. The gas turbine engine of claim 1, wherein the cutback has a height in the spanwise direction comprised between 10% and 30% of a maximum span of the blades of the sub-set of blades having the cutback.

3. The gas turbine engine of claim 1, wherein the cutback has a width in the chordwise direction comprised between 10% and 30% of a maximum chord of the blades of the sub-set of blades having the cutback.

4. The gas turbine engine of claim 1, wherein the sub-set of the plurality of blades includes only one blade.

5. The gas turbine engine of claim 1, wherein the sub-set of the plurality of blades includes only three blades.

6. The gas turbine engine of claim 1, wherein the number of blades of the sub-set of the plurality of blades having the cutback is less than half a total number of the blades of the rotor.

7. The gas turbine engine of claim 1, wherein the blades of the sub-set of the plurality of blades having the cutback are spaced from each other by other blades of the fan deprived of the cutback.

8. The gas turbine engine of claim 1, wherein the cutback has a general triangular shape.

9. The gas turbine engine of claim 1, wherein the rotor is a compressor rotor or a fan rotor of one of a turboprop engine or a turbofan engine.

10. A gas turbine engine rotor, comprising:
a hub; and
a plurality of rotor blades extending generally radially from the hub, each of the rotor blades having an airfoil portion, the airfoil portion defined by a leading edge, a trailing edge, a pressure side surface, a suction side surface, a root end, and a tip, the leading edge and the trailing edge extending spanwise between the root end and the tip, the pressure side surface and the suction side surface extending chordwise between the leading edge and the trailing edge;
wherein the plurality of rotor blades includes a sub-set of rotor blades, which sub-set has fewer rotor blades than the plurality of rotor blades, and the airfoil portion in each rotor blade within the sub-set includes a cutback that extends from the tip to the trailing edge, and from the pressure side surface to the suction side surface.

11. The gas turbine engine rotor of claim 10, wherein each of the rotor blades within the sub-set has a maximum airfoil span and a maximum airfoil chord, and the cutback has a spanwise height that is in the range of 10% of the maximum airfoil span to 30% of the maximum airfoil span, and a chordwise width that is in the range of 10% of the maximum airfoil chord to 30% of the maximum airfoil chord.

* * * * *